United States Patent
Shimono

(10) Patent No.: US 8,100,433 B2
(45) Date of Patent: Jan. 24, 2012

(54) KNEE-RESTRAINING AIRBAG DEVICE

(75) Inventor: Hiroyoshi Shimono, Yokohama (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 12/663,199

(22) PCT Filed: May 22, 2008

(86) PCT No.: PCT/JP2008/059453
§ 371 (c)(1),
(2), (4) Date: Dec. 4, 2009

(87) PCT Pub. No.: WO2008/149681
PCT Pub. Date: Dec. 11, 2008

(65) Prior Publication Data
US 2010/0181745 A1  Jul. 22, 2010

(30) Foreign Application Priority Data
Jun. 7, 2007  (JP) ................................ 2007-151843

(51) Int. Cl.
*B60R 21/16* (2006.01)
(52) U.S. Cl. .................................................. 280/730.1
(58) Field of Classification Search ................ 280/730.1
See application file for complete search history.

(56) References Cited

U.S. PATENT DOCUMENTS

| | | | |
|---|---|---|---|
| 4,300,894 A | 11/1981 | Cumming et al. | |
| 5,570,901 A | 11/1996 | Fyrainer | |
| 6,435,554 B1 | 8/2002 | Feldman | |
| 2003/0094795 A1 | 5/2003 | Takimoto et al. | |
| 2003/0127838 A1 * | 7/2003 | Freisler et al. ................ | 280/732 |

FOREIGN PATENT DOCUMENTS

| | | | |
|---|---|---|---|
| DE | 19707997 A1 | | 9/1998 |
| JP | 8-301054 A | | 11/1996 |
| JP | 2003-40069 A | | 2/2003 |
| JP | 2003-160015 A | | 6/2003 |
| JP | 2003-170799 A | | 6/2003 |
| JP | 2004009992 A | * | 1/2004 |
| JP | 2004-122922 A | | 4/2004 |
| JP | 2004-352119 A | | 12/2004 |
| JP | 2005271703 A | * | 10/2005 |
| JP | 2007-062446 A | | 3/2007 |

* cited by examiner

*Primary Examiner* — Faye M. Fleming
(74) *Attorney, Agent, or Firm* — Harness, Dickey & Pierce, P.L.C.

(57) ABSTRACT

[PROBLEMS] To improve expansion performance of an airbag.
[MEANS FOR SOLVING PROBLEMS] A knee-restraining airbag device (B) has an inflator (11), the airbag (12), an aesthetically designed cover (13) installed at the lower part of an interior article ahead, in the front-rear direction of a vehicle, of an seated occupant, and a case (14) installed on the opposite side of the aesthetically designed cover (13) from the seated occupant and forming a space (15). In a cross section of the space (15) taken in the front-rear direction of the vehicle, a cross section of an airbag receiving section (15b) in the space (15) has a vertically elongated shape. The airbag (12) is adapted such that, when it is placed in the airbag receiving section (15b), at least a part of the airbag (12) is positioned in a region closer to the occupant than a line (L) interconnecting the upper end of the case (14), which is in a state installed on the aesthetically designed cover (13), and an end surface that is located at the lower end of the case (14) and is closer to the aesthetically designed cover (13). As a result, the airbag (12) is positioned closer to the cover (13) at its surface which forms the space (15). [EFFECT] Expansion performance of the airbag is improved. When the device is used for a front passenger seat, a sufficient glove box capacity is secured and comfortable space is obtained for the passenger.

18 Claims, 5 Drawing Sheets

(a)

(b)

KNEE-RESTRAINING AIRBAG DEVICE

CROSS-REFERENCE TO RELATED APPLICATIONS

This application is a 371 U.S. National Stage of International Application No. PCT/JP2008/059453, filed May 22, 2008. This application claims the benefit of Japanese Patent Application No. 2007-151843, filed Jun. 7, 2007. The entire disclosures of the above applications are incorporated herein by reference.

TECHNICAL FIELD

The present invention relates to a knee-restraining airbag device which restrains the knees of a passenger sitting in a front seat, thereby protecting the passenger in the event of an automobile collision, for example.

BACKGROUND ART

Automobiles are equipped with a number of safety devices for ensuring the safety of a passenger. One such device is an airbag device which is stored within a case during normal operation of an automobile. In the event of an emergency such as a collision, an inflation gas generated by an inflator is injected into a folded airbag thereby causing the airbag to unfold.

For example, a knee-restraining airbag device that protects a passenger by restraining a knee of a passenger in a front seat of a vehicle during a collision (e.g., Patent Reference 1), is one such airbag device.

Patent Reference 1: Japanese Patent Application Kokai Publication No. 2003-40069

As shown in FIG. 6, device A, which is the knee-restraining airbag used for a front passenger's seat disclosed in Patent Reference 1, is installed, for example, by cutting out a space on the under side of a glove compartment 2 which is attached to a dashboard 1.

When such a knee-restraining airbag device is used for the driver's seat, it is attached to a knee panel which is coupled to a shock-absorbing member.

Note that Patent Reference 1 makes no mention of the length of the airbag in the lateral direction of the vehicle. However, it is assumed that such a knee-restraining airbag device is used for a typical driver's seat or front passenger's seat and has an opening width of 60 mm to 250 mm.

DISCLOSURE OF THE INVENTION

Problems to be Solved by the Invention

When a common airbag device such as the conventional knee-restraining airbag device disclosed in Patent Reference 1 is employed, it is necessary to make adjustments in accordance with the shape of the vehicle compartment to improve the deployment performance and reliably restrain both knees.

Moreover, when the device is used for the front passenger's seat, it is installed by cutting out a space on the under side of the glove compartment, thereby reducing the capacity of the glove compartment and rendering it less convenient to use.

It should be noted that when such a knee-restraining airbag device is installed under the glove compartment in order to ensure ample capacity for the glove compartment, leg-room for a passenger sitting in the front passenger's seat is reduced, thereby reducing the comfort of the seated passenger.

Accordingly, an object of the present invention is to solve the problems of deployment performance for conventional knee-restraining airbag devices that result from the fact that the expansion volume increases in the lateral direction of the vehicle. Another object of the present invention is to address the problem of reduced convenience of use of the glove compartment caused by the capacity of the glove compartment being reduced to accommodate the airbag device installed for the front passenger' seat, or the problem of reducing the comfort of the seated passenger if leg-room is reduced to accommodate the airbag and maintain the capacity of the glove compartment.

Means for Solving These Problems

The knee-restraining airbag device of the present invention was devised with consideration given to the above problems, and aims to improve airbag deployment performance. Embodiments of the present invention achieve good sitting comfort while ensuring ample glove compartment capacity, when the knee-restraining airbag is used for the front passenger's seat.

The knee-restraining airbag device according to an embodiment of the present invention is equipped with an inflator and an airbag, and a decorative cover attached to the underside of interior trim or structural parts of a vehicle which are located in front of a seated passenger in the longitudinal direction of the vehicle. A case is provided on the side of the decorative cover opposite to the seated passenger which forms a space which houses the inflator and the airbag. The knee-restraining airbag device comprises an airbag housing portion disposed within the space, having a cross-section with a vertically elongated shape when viewed in a cross-section taken in the longitudinal direction of the vehicle. When the knee restraining airbag device is installed in the vehicle with the airbag being arranged in the airbag housing portion in a folded configuration, at least a portion of the airbag is positioned in a region closer to the passenger than an imaginary line connecting the upper and the lower ends of the terminal surface of the case attached to the decorative cover, the surface being close to the decorative cover, so as to be disposed close to the surface of the decorative cover on the side where the space is formed.

Since the knee-restraining airbag device of the present invention is formed so that the airbag housing portion has a vertically elongated shape in a cross-section taken in the longitudinal direction of the vehicle, the space for housing the airbag becomes smaller in the longitudinal direction, and the airbag is disposed in a position that is closer to the decorative cover.

Therefore, it is necessary to elongate the airbag housing portion in the lateral direction of the vehicle in order to accommodate an airbag having the same capacity as a conventional airbag. This configuration has the effect of reducing the number of folds in the airbag, thus improving the deployment performance.

In the present invention, the terms "vertical," or "upwards" or "downwards" and their derivatives describe a part or direction positioned toward the roof side or floor side of the vehicle relative to a specified part. The term "upwards" and its derivatives describes a part or direction positioned toward the roof side of the vehicle relative to the specified part. The term "downwards" and its derivatives describes a part or direction positioned toward the floor of the vehicle relative to the specified part.

ADVANTAGEOUS EFFECTS OF THE INVENTION

In the present invention, because the airbag housing portion is long and narrow in the vertical direction and elongated in the lateral direction of the vehicle, the number of folds of the airbag is reduced, and since the airbag is disposed in a position close to the decorative cover, the deployment performance is improved.

Moreover, when used for the front passenger's seat, it is possible to provide ample capacity for the glove compartment while maintaining good sitting comfort.

DESCRIPTION OF THE REFERENCE NUMERALS

Figure 1:
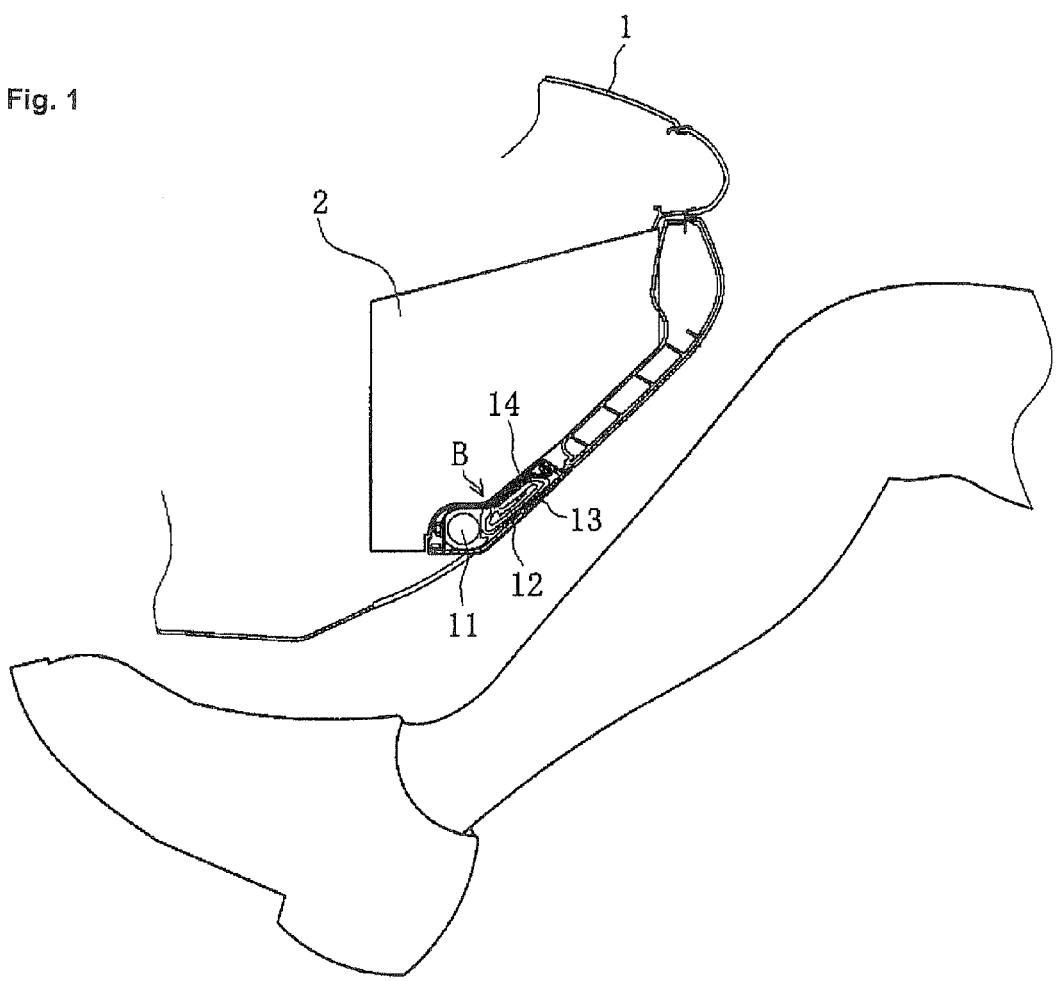
FIG. 1 is a drawing illustrating a case where an example of the knee-restraining airbag device of the present invention is installed for the front passenger's seat.

B Knee-restraining airbag device
L Line connecting the upper end of the case and a terminal surface at the lower end
of the case closer to the decorative cover
11 Inflator
11a Gas injection orifice
12 Airbag
13 Decorative cover
14 Case
15 Space
15a Airbag housing portion
15b Inflator housing portion
16 Shock-absorbing metal plate

PREFERRED EMBODIMENT

As discussed above, conventional knee-restraining airbags have problems in their deployment performance. Moreover, when used for the front passenger's seat, typically, the capacity of the glove compartment is reduced to accommodate the airbag, thereby making the glove compartment inconvenient to use. Alternatively, if the capacity of the glove compartment was maintained, the comfort of the seated passenger is reduced.

The present invention improves the deployment performance of the airbag, and ensures ample glove compartment capacity when used for the passenger's seat, while achieving good seating comfort. This may be accomplished by making the airbag housing portion long and narrow in the vertical direction and elongated in the lateral direction of the vehicle.

EXAMPLES

Embodiments of the preferred embodiment according to the present invention are described below using FIGS. 1-5.

Figure 2:
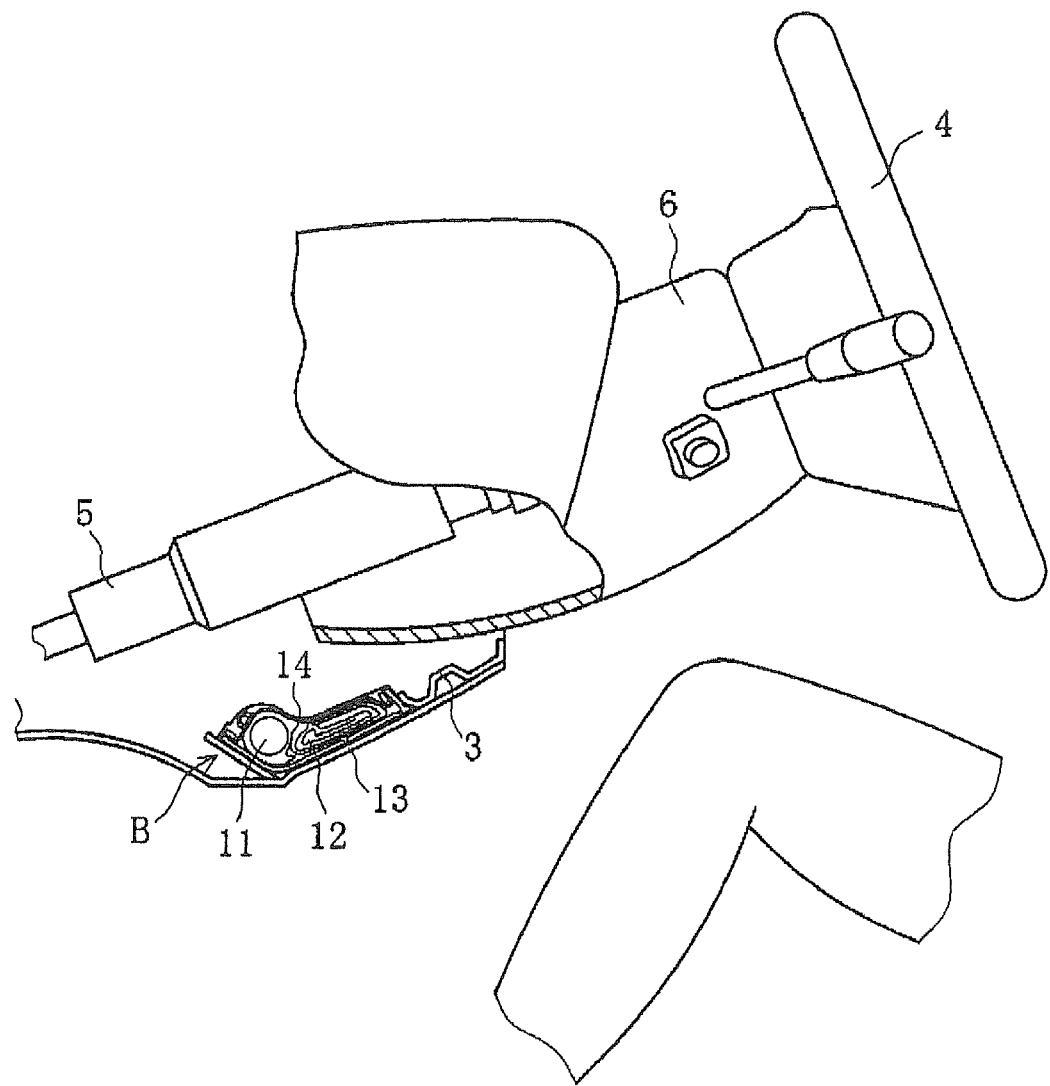
FIG. 2 is a drawing illustrating a case where an example of the knee-restraining airbag device of the present invention is installed for the driver's seat.
Figure 3:
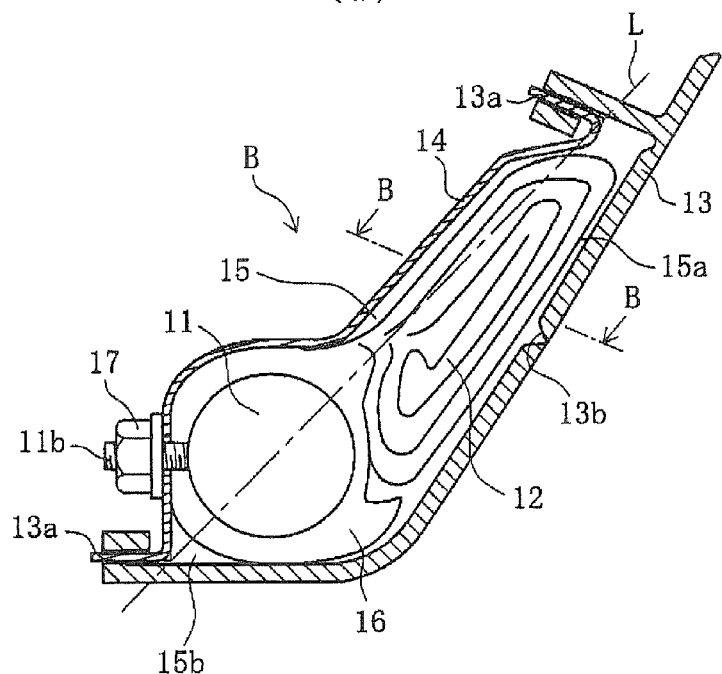
FIG. 3(a) is a sectional view in the longitudinal direction of the vehicle illustrating the first example of a knee-restraining airbag device of the present invention.
FIG. 3(b) is a sectional view along the line B-B in FIG. 3(a).
Figure 3:
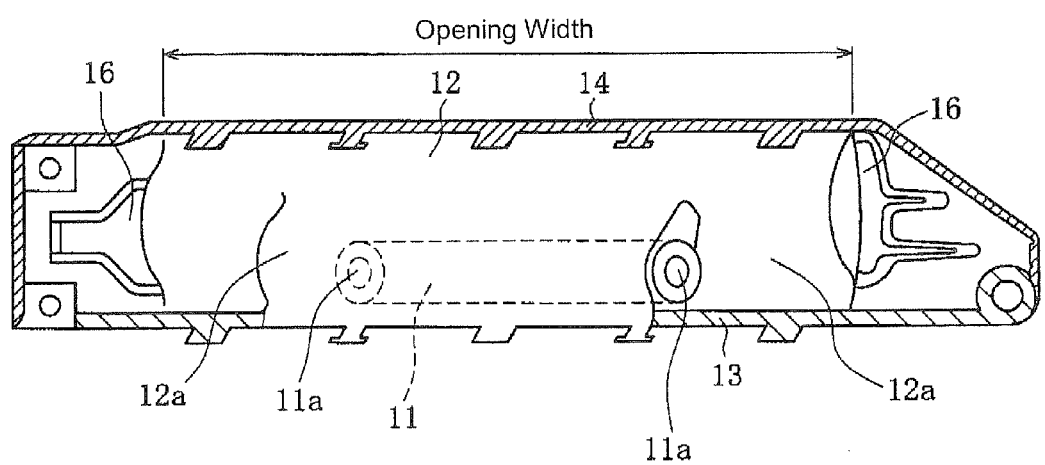
Figure 4:
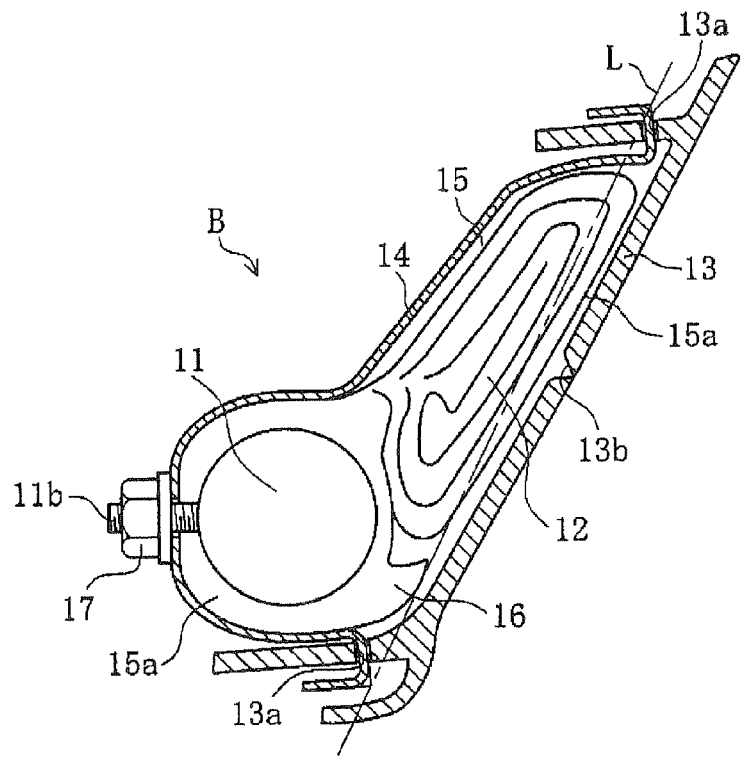
FIG. 4 is a sectional view in the longitudinal direction of the vehicle illustrating the second example of a knee-restraining airbag device of the present invention.
Figure 5:
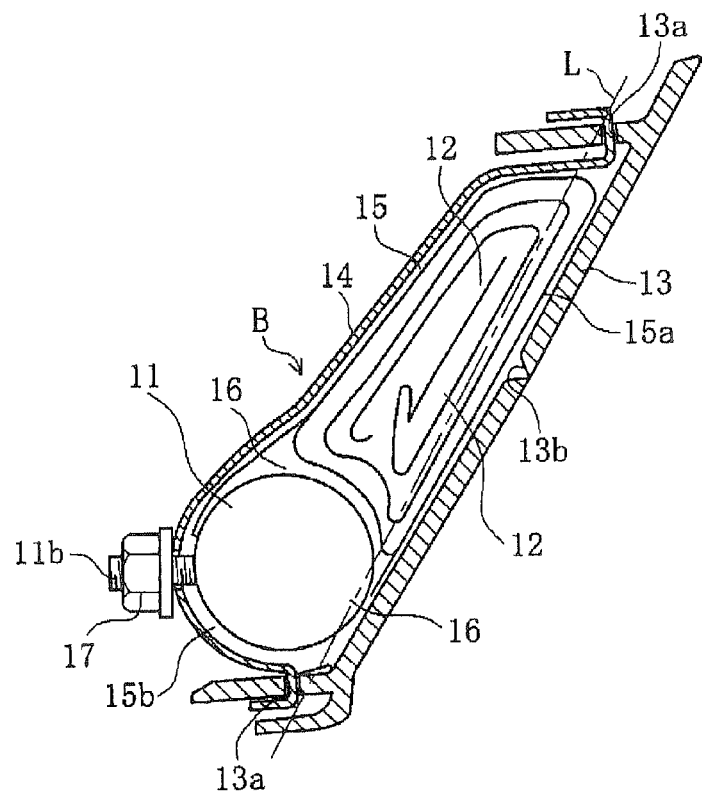
FIG. 5 is a sectional view in the longitudinal direction of the vehicle illustrating the third example of a knee-restraining airbag device of the present invention.
Figure 6:
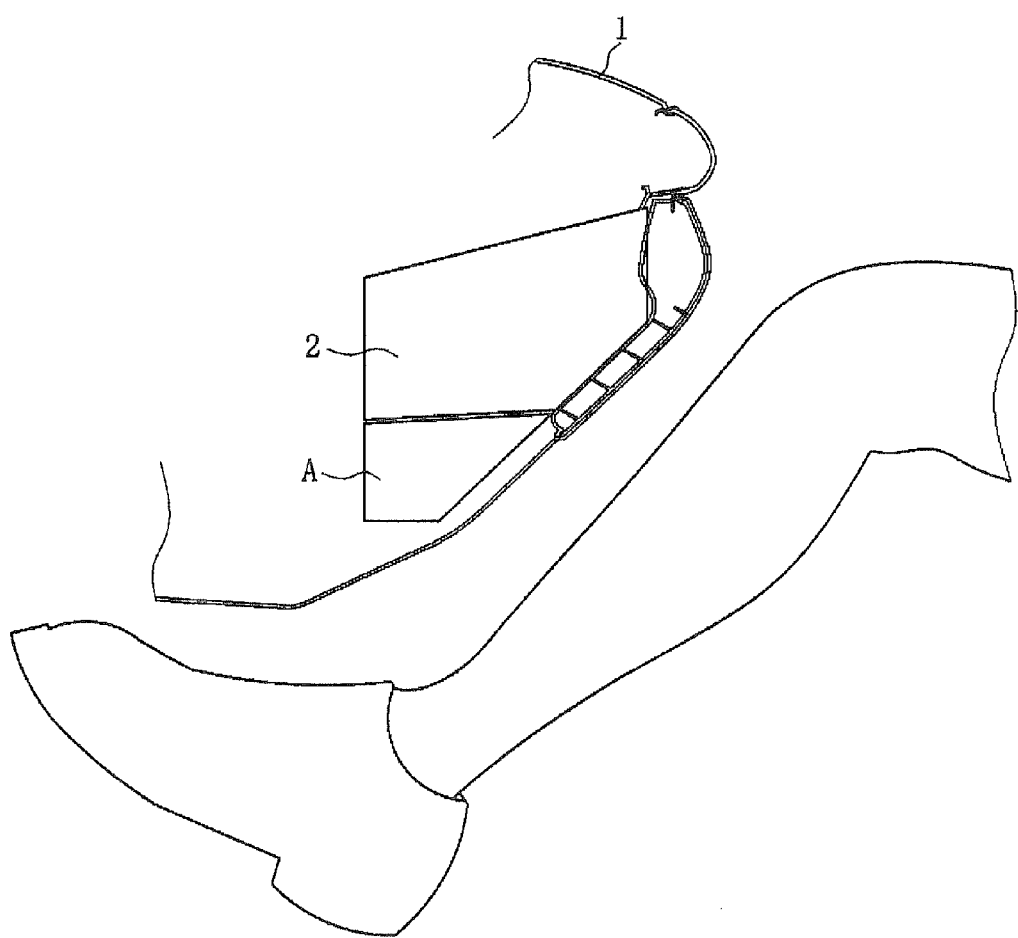
FIG. 6 is a drawing illustrating a conventional knee-restraining airbag used for the front passenger's seat.

FIG. 1 illustrates a first embodiment of the knee-restraining airbag device of the present invention that is installed in a vehicle for the front passenger's seat. FIG. 2 illustrates a first embodiment of the knee-restraining airbag device of the present invention that is installed in a vehicle for the driver's seat. FIG. 3(a) is a cross-sectional view of the embodiments of FIGS. 1 and 2 taken in the longitudinal direction of the vehicle. FIG. 3(b) is a cross-sectional view of the embodiment of FIG. 3(a) taken along the line B-B of FIG. 3(a). FIGS. 4 and 5 are sectional views like FIG. 3(b), illustrating the second and third embodiments of the knee-restraining airbag device of the present invention.

Turning to FIG. 1, B is a knee-restraining airbag device of the present invention equipped with an inflator 11 which injects gas into a folded airbag 12, which expands due to the highly pressurized gas injected by the inflator 11 if the vehicle experiences an impact such as a collision.

The inflator 11 and the airbag 12 are housed within a space 15 formed by the decorative cover 13 and the case 14. In this embodiment, both the inflator 11 and the airbag 12 are installed on an underside of interior trim or structural parts located in front of the passenger seat taken in the direction of forward motion.

For example, as shown in FIG. 1, when the knee-restraining airbag device B is used for the front passenger's seat, the decorative cover 13 is attached to the under side of the glove compartment 2, which is attached to the dashboard 1. As shown in FIG. 2, when the knee-restraining airbag device B is used for the driver's seat, the decorative cover 13 is attached to a knee panel 3, which is in turn coupled to a shock-absorbing member, for example.

Additionally, the case 14 is attached to the decorative cover 13, on a side opposite to that of the passenger sitting in the seat, the case 14 and the decorative cover 13 thereby forming a space 15 therebetween that accommodates the inflator 11 and the airbag 12. As shown in FIGS. 3 to 5, for example, installation of the case 14 may be simple, with the upper and lower ends of the case 14 inserted into the fitting holes 13a disposed in the decorative cover 13. It should be noted that in FIG. 3 to FIG. 5, Reference Numeral 13b refers to a portion of the decorative cover 13 which is predetermined to break.

In the present invention, the space 15 is formed in such a manner that, when viewed in a cross-section taken in the longitudinal direction of the vehicle, the cross-section of the airbag housing portion 15a has a long and narrow shape in the vertical direction within the space 15.

Because the space 15 has a long, narrow shape in the vertical direction, the volume of the airbag housing portion 15a becomes small due to its smaller cross sectional area. Thus, in order to accommodate the airbag 12 with the same capacity as a conventional airbag, the airbag housing portion 15a is elongated in the lateral direction of the vehicle. For example, in the present invention, the opening width of the airbag is on the order of 385 mm, as compared to the opening width of 60 mm to 250 mm of a prior art airbag.

Moreover, when the airbag 12 is housed within the airbag housing portion 15a, at least a portion of the airbag 12 is positioned in a folded state in a region that is closer to the passenger than a line L connecting the upper and the lower ends of the surface of the case 14 attached to the decorative cover 13, the surface being located closer to the decorative cover. The formation of this configuration is determined by the position at which the case 14 is installed with respect to the decorative cover 13, as illustrated in FIGS. 3-5.

Because the airbag 12 is housed in the housing portion 15a in this configuration, the airbag 12 is closer to the surface of the decorative cover 13 on the side where the decorative cover 13 forms the space 15.

That is to say, due to the fact that the airbag housing portion 15a has a narrow structure in the longitudinal direction of the vehicle and a wide structure in the lateral direction of the vehicle. This shape of the housing portion 15a results in a smaller number of folds in the airbag 12 and causes the airbag 12 to be positioned close to the decorative cover 13.

Consequently, the deployment performance of the airbag 12 improves. In addition, when the knee-restraining airbag device is used for the front passenger's seat, sufficient legroom and good sitting comfort can be achieved for the passenger seated in the front passenger's seat, while ensuring ample capacity for the glove compartment.

It should be understood that provided that the knee-restraining airbag device B of the present invention has the above-described structure, other parts of the knee-restraining airbag device 13 may be configured in other ways. But the structures such as those shown in FIGS. 3-5, may be even more effective.

For example, the inflator 11 may be disposed in the inflator housing portion 15b within the space 15 such that the length of the inflator 11 is in the lateral direction of the vehicle when viewed from the passenger's side. Also, the airbag 12 is disposed so that a portion 12a of the airbag 12 reaches the respective outer sides of both lengthwise ends of the inflator 11. According to such a structure, the folded state of the airbag 12 is thinner and more compact in the longitudinal direction, and wider in the lateral direction of the vehicle.

Furthermore, as shown in FIG. 3(b), if the inflator 11 in the above-described state is provided with a gas injection orifice 11a at both ends in the lengthwise direction, the supply of gas to the airbag 12 is smooth, thus making it possible to reduce the deployment time as compared to conventional knee restraining airbags.

Yet further, as shown in FIGS. 3 and 5, the inflator 11 may be disposed within the space 15, in such a manner that at least a portion of the inflator 11 is positioned in a region closer to the passenger than the imaginary line L connecting the upper and the lower ends of the surface of the case 14, the surface being located closer to the decorative cover. According to such a structure, the length of the device in the longitudinal direction of the vehicle becomes more compact, thereby making deployment of the airbag smoother.

Yet further, if the inflator 11 is attached to the case 14, then the degree of freedom in design is greater for housing the inflator 11 and the airbag 12 within the space 15, thereby making it possible to readily house the airbag 12 and the inflator 11 in a desired position. It should be noted that in FIGS. 3-6, Reference Numeral 11b is a mounting bolt for the inflator 11, and Reference Numeral 17 is a nut.

Moreover, if the airbag housing portion 15a is provided above the inflator housing portion 15b, then the length of the device can be made even more compact in the longitudinal direction of the vehicle.

As shown in FIG. 3(b), a shock-absorbing metal plate 16 may be provided within the space 15. The shock-absorbing metal plate 16 may be disposed further toward the outer sides of both ends of the folded airbag 12 in the lateral direction of the vehicle. If such a structure is employed, a sufficient reaction force for the force exerted by deployment of the airbag 12 can be achieved, thus increasing the stability and speed of the deployment.

The present invention is not limited to the foregoing examples, and the embodiments can of course be suitably modified, as long as they are within the scope of the technical ideas recited in the claims.

That is to say, the knee-restraining airbag devices described above are advantageous examples of the present invention, but other embodiments can also be implemented or executed using a variety of methods. For example, if there are restrictive descriptions in the specification, the components described above may have any shape, size or arrangement consistent. Moreover, the expressions and terminology employed in this specification are for the purpose of explanation, and are not intended to be limiting.

For example, when used for the driver's seat, installation of the knee-restraining airbag device of the present invention is not limited to being attached to the knee panel 3 as shown in FIG. 2. Instead, the device may be attached to a column cover 6 and is disposed so as to cover a steering column 5 under the steering wheel 4.

Furthermore, the items recited in claims 2-7 may not necessarily be required, and the elements recited therein may be suitably combined in examples other than those illustrated in FIGS. 3-6.

INDUSTRIAL APPLICABILITY

The knee-restraining airbag device of the present invention in installed for use in automobiles, but it can also be installed in any other type of vehicle, such as, for example, an airplane or a ship, and it will exhibit the same advantageous effects.

The invention claimed is:

1. A knee-restraining airbag device for a vehicle comprising:
a decorative cover;
a case defining a space having an airbag housing portion, the case including a surface adjacent the decorative cover, the surface having an upper end and a lower end connected to the decorative cover, the upper and lower ends connected by an imaginary line; and
an airbag disposed in the airbag housing portion in a folded configuration, at least a portion of the airbag disposed on both sides of the imaginary line;
wherein the space further defines an inflator housing portion and the device further comprises an inflator disposed in the inflator housing portion such that a length of the inflator is oriented in a lateral direction of the vehicle when viewed from a passenger's side, and the airbag extends to respective outer sides of both lengthwise ends of the inflator.

2. The knee-restraining airbag device of claim 1, wherein the airbag housing portion has a cross section with a vertically elongated shape when viewed in a longitudinal direction of the vehicle.

3. The knee-restraining airbag device according to claim 1, wherein the inflator is provided with a gas injection orifice at both ends in a lengthwise direction.

4. The knee-restraining airbag device according to claim 1, wherein the inflator is disposed in the inflator housing portion such that at least a portion of the inflator is positioned on both sides of the imaginary line.

5. The knee-restraining airbag device according to claim 1, wherein the inflator is attached to the case.

6. The knee-restraining airbag device according to claim 1, wherein the inflator is attached to the case.

7. The knee-restraining airbag device according to claim 1, wherein the airbag housing portion is disposed above the inflator housing portion.

8. The knee-restraining airbag device according to claim 4, wherein the airbag housing portion is disposed above the inflator housing portion.

9. The knee-restraining airbag device according to claim 5, wherein the airbag housing portion is disposed above the inflator housing portion.

10. A knee-restraining airbag device for a vehicle comprising:
a decorative cover;
a case defining a space having an airbag housing portion, the case including a surface adjacent the decorative cover, the surface having an upper end and a lower end connected to the decorative cover, the upper and lower ends connected by an imaginary line;
an airbag disposed in the airbag housing portion in a folded configuration, at least a portion of the airbag disposed on both sides of the imaginary line; and
a shock-absorbing metal plate disposed within the space, the metal plate extending toward outer sides of both ends of the folded airbag in a lateral direction of the vehicle.

11. The knee-restraining airbag device according to claim 4, further comprising a shock-absorbing metal plate disposed within the space, the metal plate extending toward outer sides of both ends of the folded airbag in a lateral direction of the vehicle.

12. The knee-restraining airbag device according to claim 5, further comprising a shock-absorbing metal plate disposed within the space, the metal plate extending toward outer sides of both ends of the folded airbag in a lateral direction of the vehicle.

13. The knee-restraining airbag device according to claim 7, further comprising a shock-absorbing metal plate disposed within the space, the metal plate extending toward outer sides of both ends of the folded airbag in a lateral direction of the vehicle.

14. A knee-restraining airbag device for a vehicle comprising:
a decorative cover;
a case defining a space having an airbag housing portion and an inflator receiving portion, the case including a surface adjacent the decorative cover, the surface having an upper end and a lower end connected to the decorative cover, the upper and lower ends connected by an imaginary line;
an airbag disposed in the airbag housing portion in a folded configuration, at least a portion of the airbag disposed on both sides of the imaginary line; and
an inflator disposed in the inflator housing portion, the inflator disposed in the inflator housing portion such that at least a portion of the inflator is positioned on both sides of the imaginary line.

15. The knee-restraining airbag device according to claim 1, wherein the airbag is directly disposed within the case.

16. The knee-restraining airbag device according to claim 15, wherein at least a substantial portion of the airbag is disposed on both sides of the imaginary line.

17. The knee-restraining airbag device according to claim 15, wherein a greater portion of the airbag in the folded configuration is disposed on a side of the imaginary line adjacent the cover as compared to a side of the imaginary line adjacent the case.

18. The knee-restraining airbag device according to claim 1, wherein the decorative cover includes first and second decorative cover ends secured to the case, the case directly housing the folded airbag.

\* \* \* \* \*